US012560497B2

(12) United States Patent
Yoshihara et al.

(10) Patent No.: US 12,560,497 B2
(45) Date of Patent: Feb. 24, 2026

(54) STRAIN AMOUNT DETECTION DEVICE, AND TIRE

(71) Applicant: Hitachi Astemo, Ltd., Hitachinaka (JP)

(72) Inventors: Kenji Yoshihara, Hitachinaka (JP); Hiroyuki Abe, Hitachinaka (JP); Tsukasa Takahashi, Hitachinaka (JP); Takeo Hosokawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 285 days.

(21) Appl. No.: 18/275,625

(22) PCT Filed: Aug. 31, 2021

(86) PCT No.: PCT/JP2021/031849
§ 371 (c)(1),
(2) Date: Aug. 3, 2023

(87) PCT Pub. No.: WO2022/195919
PCT Pub. Date: Sep. 22, 2022

(65) Prior Publication Data
US 2024/0085253 A1 Mar. 14, 2024

(30) Foreign Application Priority Data
Mar. 16, 2021 (JP) ................................. 2021-042269

(51) Int. Cl.
*G01L 1/22* (2006.01)
*G01M 17/02* (2006.01)
*B60C 19/00* (2006.01)

(52) U.S. Cl.
CPC ........... *G01L 1/2231* (2013.01); *G01M 17/02* (2013.01); *B60C 2019/004* (2013.01)

(58) Field of Classification Search
CPC ......... G01L 1/18; G01L 1/125; G01L 1/2287; G01L 5/24; G01L 1/2206; G01L 1/16;
(Continued)

(56) References Cited

U.S. PATENT DOCUMENTS 6,915,708 B2 * 7/2005 Isono .................... G01L 5/1627
73/862.041
7,249,498 B2 * 7/2007 Miyoshi ................. G01L 5/164
73/146
(Continued)

FOREIGN PATENT DOCUMENTS

CN 113646605 A * 11/2021 ............... G01L 5/04
JP 2011-242279 A 12/2011
(Continued)

OTHER PUBLICATIONS

International Search Report, PCT/JP2021/031849, Nov. 2, 2021.

*Primary Examiner* — Andre J Allen
(74) *Attorney, Agent, or Firm* — Volpe Koenig

(57) ABSTRACT

An object of the present invention is to provide a strain amount detection device capable of accurately detecting deformations, in multiple directions, of a tire by one strain measuring element. A strain amount detection device according to the present invention includes a disk-shaped base member that holds a strain measuring element, in which the base member acts as a strain body by transmitting strain of a tire to the strain measuring element.

7 Claims, 5 Drawing Sheets

(58) Field of Classification Search
CPC ..... G01L 1/225; G01L 1/2281; G01L 1/2293;
G01L 1/24; G01L 1/20; G01L 1/22;
G01L 1/142; G01L 1/127; G01L 5/0033;
G01L 1/14; G01L 5/0047; G01L 1/26;
G01L 5/0004; G01L 1/242; G01L 1/241;
G01L 1/246; G01L 1/2231; G01L 1/2262;
G01L 5/0076; G01L 5/0038; G01L 1/005;
G01L 5/00; G01L 1/2218; G01L 5/246;
G01L 3/102; G01L 5/243; G01L 1/205;
G01L 9/0054; G01L 1/255; G01L 5/102;
G01L 3/105; G01L 5/0052; G01L 5/10;
G01L 5/162; G01L 5/0061; G01L 5/0042;
G01L 9/0042; G01L 9/0055; G01L
1/2268; G01L 25/00; G01L 9/065; G01L
1/2243; G01L 5/0019; G01L 1/144; G01L
5/101; G01L 1/04; G01L 1/162; G01L
5/103; G01L 5/0057; G01L 5/1627; G01L
1/2225; G01L 1/247; G01L 1/00; G01L
5/165; G01L 3/10; G01L 1/2212; G01L
3/108; G01L 5/0085; G01L 5/107; G01L
9/0052; G01L 5/161; G01L 1/10; G01L
1/12; G01L 11/02; G01L 1/02; G01L
1/06; G01L 1/106; G01L 1/148; G01L
11/025; G01L 5/228; G01L 1/146; G01L
1/165; G01L 1/245; G01L 9/0002; G01L
19/147; G01L 5/06; G01L 1/2237; G01L
5/04; G01L 5/047; G01L 9/0073; G01L
9/0075; G01L 1/2256; G01L 5/225; G01L
9/0072; G01L 1/243; G01L 25/003; G01L
9/0051; G01L 1/248; G01L 19/0092;
G01L 5/0028; G01L 5/042; G01L 5/045;
G01L 5/108; G01L 5/223; G01L 1/25;
G01L 5/008; G01L 5/167; G01L 9/045;
G01L 9/16; G01L 3/12; G01L 5/106;
G01L 5/12; G01L 9/0022; G01L 9/0098;
G01L 9/06; G01L 1/183; G01L 19/04;
G01L 1/2275; G01L 5/22; G01L 5/226;
G01L 9/04; G01L 5/16; G01L 5/0071;
G01L 5/136; G01L 19/148; G01L 9/0019;
G01L 19/02; G01L 5/0009; G01L 9/002;
G01L 3/103; G01L 3/104; G01L 5/28;
G01L 9/007; G01L 9/12; G01L 1/186;
G01L 19/0084; G01L 23/18; G01L 5/105;
G01L 19/086; G01L 3/242; G01L 5/221;
G01L 9/0001; G01L 9/0061; G01L 1/044;
G01L 1/122; G01L 5/0066; G01L 5/08;
G01L 9/125; G01L 9/0035; G01L 1/042;
G01L 23/10; G01L 3/101; G01L 19/0038;
G01L 3/24; G01L 5/0014; G01L 5/009;
G01L 5/133; G01L 5/164; G01L 9/006;
G01L 9/0077; G01L 9/008; G01L 9/08;
G01L 13/025; G01L 3/106; G01L 3/1457;
G01L 5/14; G01L 19/0636; G01L 19/146;
G01L 9/0041; G01L 1/103; G01L 27/002;
G01L 3/1428; G01L 3/1478; G01L 5/13;
G01L 9/0014; G01L 9/0079; G01L 9/10;
G01L 1/167; G01L 11/04; G01L 19/0645;
G01L 19/14; G01L 3/00; G01L 3/045;
G01L 3/14535; G01L 9/0005; G01L
9/0013; G01L 9/0025; G01L 9/0048;
G01L 9/0076; G01L 19/0007; G01L
19/083; G01L 3/14; G01L 3/1485; G01L
3/247; G01L 5/26; G01L 7/00; G01L
9/005; G01L 9/0064; G01L 11/00; G01L
11/06; G01L 17/005; G01L 19/003; G01L
27/005; G01L 5/03; G01L 9/02; G01L
1/046; G01L 11/006; G01L 17/00; G01L
19/0061; G01L 19/08; G01L 25/006;
G01L 3/02; G01L 3/04; G01L 3/08;
G01L 3/109; G01L 5/0023; G01L 5/169;
G01L 7/024; G01L 7/16; G01L 9/0023;
G01L 13/023; G01L 19/00; G01L
19/0046; G01L 23/08; G01L 23/22; G01L
3/1471; G01L 5/166; G01L 5/18; G01L
5/20; G01L 7/082; G01L 7/18; G01L
9/00; G01L 9/0004; G01L 9/0027; G01L
9/0047; G01L 9/14; G01L 9/18; G01L
1/048; G01L 1/08; G01L 1/083; G01L
1/086; G01L 11/008; G01L 19/0069;
G01L 19/0618; G01L 19/0627; G01L
19/141; G01L 19/143; G01L 19/145;
G01L 19/16; G01L 21/00; G01L 21/02;
G01L 21/20; G01L 23/02; G01L 23/12;
G01L 23/16; G01L 27/00; G01L 3/1414;
G01L 3/1464; G01L 3/16; G01L 3/22;
G01L 5/163; G01L 5/286; G01L 7/04;
G01L 7/043; G01L 7/08; G01L 7/084;
G01L 7/10; G01L 9/0007; G01L 9/0008;
G01L 9/0017; G01L 9/0038; G01L
9/0044; G01L 9/0045; G01L 9/0082;
G01L 9/0083; G01L 9/0086; G01L
9/0092; G01L 9/025; G01L 15/00; G01L
19/0023; G01L 19/0654; G01L 19/0681;
G01L 19/069; G01L 19/142; G01L
23/222; G01L 3/1492; G01L 3/18; G01L
5/1623; G01L 5/171; G01L 5/173; G01L
7/02; G01L 7/022; G01L 7/166; G01L
9/003; G01L 9/0036; G01L 9/105; G01M
5/0033; G01M 5/005; G01M 5/0041;
G01M 5/0083; G01M 99/00; G01M
5/0091; G01M 5/0016; G01M 99/007;
G01M 5/0066; G01M 5/0058; G01M
5/0025; G01M 11/086; G01M 5/0075;
G01M 13/04; G01M 11/088; G01M
13/023; G01M 13/00; G01M 5/0008;
G01M 7/08; G01M 11/083; G01M
13/005; G01M 13/027; G01M 7/00;
G01M 99/008; G01M 11/081; G01M
5/00; G01M 7/025; G01M 99/001; G01M
7/027; G01M 13/025; G01M 11/085;
G01M 15/14; G01M 9/06; G01M 17/04;
G01M 9/062; G01M 13/02; G01M
17/007; G01M 13/045; G01M 3/2846;
G01M 17/02; G01M 7/022; G01M
99/005; G01M 13/021; G01M 17/0078;
G01M 99/004; G01M 17/00; G01M 3/18;
G01M 17/013; G01M 17/022; G01M
17/0074; G01M 7/045; G01M 15/02;
G01M 11/08; G01M 13/026; G01M
13/028; G01M 3/047; G01M 3/3218;
G01M 1/125; G01M 3/2853; G01M
13/022; G01M 17/0072; G01M 3/3272;
G01M 10/00; G01M 11/30; G01M 11/39;
G01M 17/08; G01M 3/00; G01M 3/26;
G01M 3/36; G01M 3/366; G01M 7/06;
G01M 9/00; G01M 17/027; G01M 3/022;
G01M 3/04; G01M 3/38; G01M 3/40;
G01M 7/04; G01M 9/04; G01M 1/10;
G01M 1/12; G01M 1/22; G01M 1/36;

G01M 15/042; G01M 17/06; G01M 3/02; G01M 3/045; G01M 3/20; G01M 3/2869; G01M 3/32; G01M 7/02; G01M 99/002; G01M 15/00; G01M 15/11; G01M 17/065; G01M 3/027; G01M 3/22; G01M 3/283; G01M 3/2861; G01M 3/2884; G01M 9/08; G01M 1/122; G01M 1/127; G01M 1/16; G01M 1/26; G01M 11/02; G01M 11/331; G01M 11/335; G01M 11/337; G01M 15/046; G01M 15/06; G01M 15/09; G01M 17/021; G01M 17/025; G01M 3/12; G01M 3/185; G01M 3/186; G01M 3/223; G01M 3/24; G01M 3/2807; G01M 3/2815; G01M 3/2876; G01M 3/363; G01M 9/065; G01M 13/003; G01M 15/12; G01M 17/0076; G01M 17/10; G01M 3/005; G01M 3/28; G01M 3/3281; B60C 19/00; B60C 23/0408; B60C 23/0493; B60C 2019/004; B60C 99/006; B60C 11/24; B60C 23/064; B60C 23/066; B60C 1/00; B60C 23/0411; B60C 23/06; B60C 3/00; B60C 23/041; B60C 23/0483; B60C 23/20; B60C 25/002

USPC .................................... 73/760–860, 146–146
See application file for complete search history.

(56) References Cited

U.S. PATENT DOCUMENTS

| | | | | |
|---|---|---|---|---|
| 7,513,144 B2 * | 4/2009 | Miyoshi | ................. | G01L 5/169 |
| | | | | 73/146 |
| 12,038,336 B2 * | 7/2024 | Niwa | ................... | G01L 1/2262 |
| 2010/0281968 A1 * | 11/2010 | Kubota | ................ | B60T 8/1725 |
| | | | | 73/146 |
| 2021/0370727 A1 | 12/2021 | Yamaguchi | | |

FOREIGN PATENT DOCUMENTS

| | | | | | | |
|---|---|---|---|---|---|---|
| JP | 2016-151459 A | | 8/2016 | | | |
| JP | 2020-055402 A | | 4/2020 | | | |
| KR | 20190062791 A | * | 6/2019 | .......... | B60C 23/064 |
| WO | 2008/059838 A1 | | 5/2008 | | | |
| WO | WO-2023073787 A1 | * | 5/2023 | .......... | B60C 23/064 |

* cited by examiner

SLIP ANGLE

TRAVELING DIRECTION

TIRE

TIRE ROTATION DIRECTION

GROUND CONTACT LOAD DISTRIBUTION

A POINT          B POINT

A POINT          B POINT
SLIP ANGLE 0°

A POINT          B POINT
SLIP ANGLE 2°

A POINT          B POINT
SLIP ANGLE 4°

A POINT          B POINT
SLIP ANGLE 10°

DEFORMATION SITUATION OF
TIRE GROUND CONTACT SURFACE

STRAIN AMOUNT DETECTION DEVICE, AND TIRE

TECHNICAL FIELD

The present invention relates to a strain amount detection device that detects a strain amount of a tire.

BACKGROUND ART

As a sensor that acquires a state of a tire mounted on a vehicle, a tire strain measuring element is known. The tire strain measuring element is attached to, for example, the inner surface of a tire, and converts strain of a member caused by strain of the tire into an electrical signal and outputs the electrical signal.

PTL 1 below describes a component that is attached to the inner circumferential surface of a tire to acquire a state of the tire. The literature describes a technique in which, in order to provide 'a functional component and the like capable of securing a sufficient thickness of an adhesive and improving adhesive strength when the functional component is attached to a tire', 'a functional component, which houses an electronic component capable of acquiring information on the inside of a tire and can be attached to an inner circumferential surface of the tire, is configured to include: a storage part for the electronic component; a housing having a bottom surface facing the inner circumferential surface of the tire; and a cylindrical part extending from a circumferential edge of the bottom surface toward the inner circumferential surface' (see ABSTRACT).

PTL 2 below describes that, in order to 'provide a strain measuring structure and a strain measuring method that are advantageous in accurately measuring strain of a reinforcing fiber in a fiber-reinforced elastomer', 'a belt cord 20 is a reinforcing fiber extending in a certain direction inside an elastomer including a tread rubber 12A and a topping rubber 22. A hole 24 for exposing the portion of the belt cord 20 to the outside of the elastomer is formed in the elastomer. A strain gauge attaching base 26 is attached to a portion where the belt cord 20 is exposed at the bottom of the hole 24. The Young's modulus of the strain attaching base 26 is 10 times or more the Young's modulus of the elastomer and $\frac{1}{10}$ or less of the Young's modulus of the belt cord 20. A strain gauge 28 is attached to a portion of the strain gauge attaching base 26 located on the opposite side of the belt cord 20. The hole 24 is filled with a filling material 32. It describes a technology that the strain of the belt cord is measured by the strain gauge 28 (see ABSTRACT).

CITATION LIST

Patent Literature

PTL 1: JP 2020-055402 A
PTL 2: JP 2011-242279 A

SUMMARY OF INVENTION

Technical Problem

When a vehicle turns, a direction in which a tire is deformed also changes according to the state and direction of the turning. When the detection axis of a strain measuring element and the deformation direction of the tire are different from each other, strain detection accuracy is deteriorated. Therefore, it is necessary to dispose the strain measuring element for each direction in which the deformation of the tire is detected. When deformations in multiple directions are to be detected by one strain measuring element, a member that accurately transmits the deformation directions of the tire and the deformation amounts thereof to the strain measuring element is required in order to improve the detection accuracy.

In PTL 1, a strain sensor 68 is attached to the bottom surface of a housing 2, and the housing 2 and the inner surface of the tire 10 are bonded to each other with an adhesive B, whereby the strain sensor 68 and the inner surface of the tire 10 are brought into direct contact with each other. According to 0049 in the literature, it is preferable for strain measurement to bring the strain sensor 68 and the inner surface of the tire into direct contact with each other in this manner. According to paragraphs 0049 through 0051 in the literature, however, the strain amount of the tire 10 is larger than the measurable range of the strain sensor 68, so that it is difficult to properly measure the strain amount as it is. Therefore, in the Literature, the measurement range is adjusted with the adhesive B alleviating the strain.

In the above configuration in PTL 1, the strain of the tire 10 is transmitted to the strain sensor 68 via the adhesive B. The adhesive B is not necessarily deformed in the same direction as the deformation of the tire 10, and may be irregularly deformed. This is because the planar shape of the adhesive B is not necessarily isotropic within the bonding surface, and may have an irregular shape. Therefore, in the literature, it is conceivable that the detection accuracy for a deformation in a direction, for example, other than the direction of the detection axis may be deteriorated.

In PTL 2, the hole 24 is provided in the surface of the tire, and the strain gauge 28 is attached in the hole 24 via the base 26. Since the literature aims to measure the strain of the reinforcing fiber of the tire, the strain of the reinforcing fiber must be transmitted to the strain gauge 28. Therefore, in the literature, the Young's modulus of the base 26 is set to $\frac{1}{10}$ or less of the Young's modulus of the belt cord 20 (reinforcing fiber), and the base 26 acts as a simple relay member that transmits the strain of the reinforcing fiber as it is to the strain gauge 28. That is, in the literature, there is no member corresponding to a strain body of the strain gauge 28. Since the base 26 is a soft member, it is not necessarily isotropically deformed with respect to the deformation of the reinforcing fiber, and may be irregularly deformed. Therefore, it is conceivable that there is a problem similar to that in PTL 1.

The present invention has been made in view of the above problems, and an object thereof is to provide a strain amount detection device capable of accurately detecting deformations, in multiple directions, of a tire by one strain measuring element.

Solution to Problem

A strain amount detection device according to the present invention includes a disk-shaped base member that holds a strain measuring element, in which the base member acts as a strain body by transmitting strain of a tire to the strain measuring element.

Advantageous Effects of Invention

According to the strain amount detection device according to the present invention, deformations, in multiple directions, of a tire can be accurately detected by one strain measuring element.

DESCRIPTION OF EMBODIMENTS

<Tire Strain>

Hereinafter, an example of a cause that causes strain of a tire and usefulness of detecting the strain will first be described. Thereafter, a configuration example of a strain amount detection device according to an embodiment of the present invention will be described.

Figure 1:
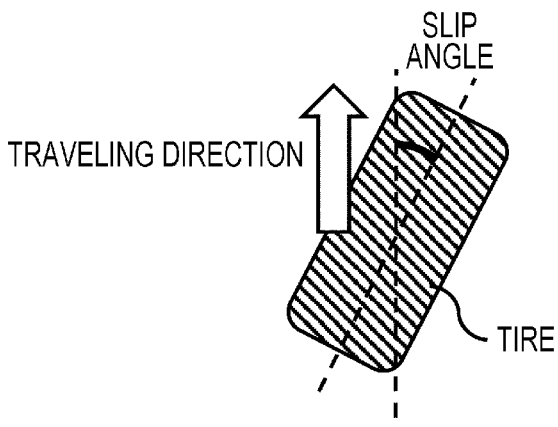
FIG. 1 is a schematic view for explaining a slip angle of a tire.

FIG. 1 is a schematic view for explaining a slip angle of a tire. A tire included in a vehicle normally faces in the same direction as a traveling direction of the vehicle. In FIG. 1, all the tires normally face in the vertical direction in FIG. 1. When the tire slips, however, the traveling direction of the vehicle and the direction of the tire deviate from each other, and a slip angle as illustrated in FIG. 1 may occur.

Figure 2:
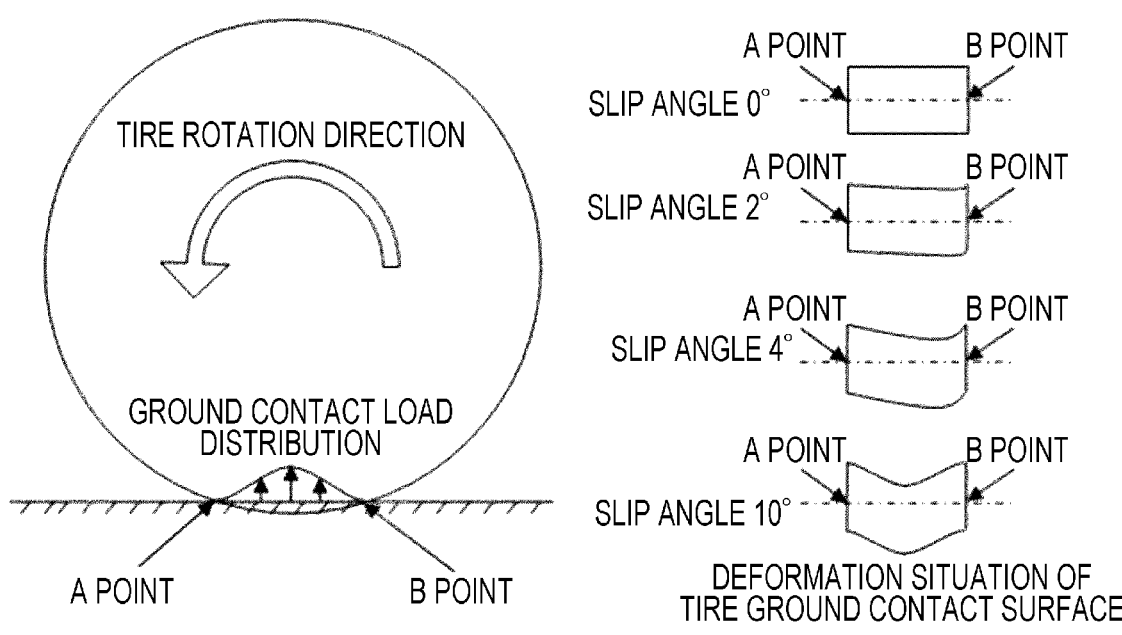
FIG. 2 is a view for explaining a relationship between a slip angle of a tire and tire strain.

FIG. 2 is a view for explaining a relationship between a slip angle of a tire and tire strain. The left in FIG. 2 is a schematic side view of a tire, and the right in FIG. 2 is a top view of a tire illustrating a state in which the tire is strained. The direction of a force acting on the tire so as to strain the tire varies depending on the slip angle of the tire. When the slip angle is, for example, 4°, a force, straining the tire in a substantially lower right direction in FIG. 2, acts.

As described above, the deformation direction of the strain of the tire and the deformation amount thereof have a correspondence relationship with the slip angle. Therefore, by grasping the deformation direction of the tire and the deformation amount thereof, for example, when the vehicle turns or the like, it is possible to detect a sign of slip and spinning of the tire as compared with when normal driving is performed. As a result, it is possible to alert the driver or control the vehicle in a more advanced manner, which can enhance the safety of the vehicle.

First Embodiment

Figure 3:
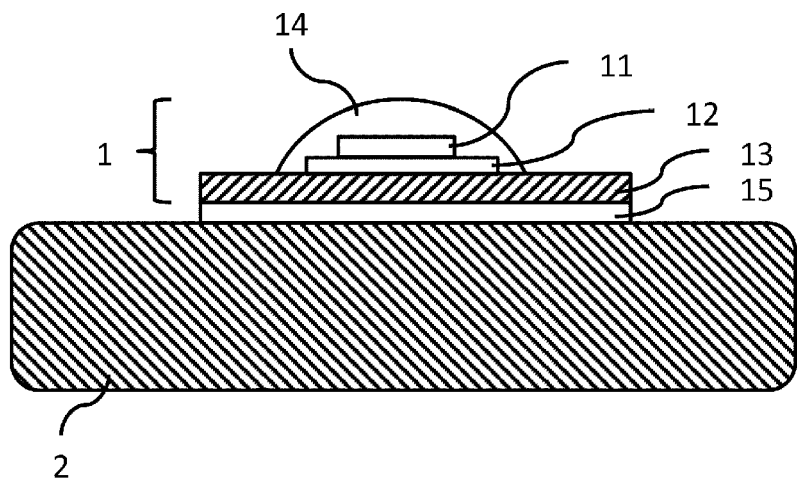
FIG. 3 is a schematic side view illustrating a configuration of a strain amount detection device 1 according to a first embodiment.

FIG. 3 is a schematic side view illustrating a configuration of a strain amount detection device 1 according to a first embodiment of the present invention. The strain amount detection device 1 is attached to the inner surface of a tire 2 and detects strain of the tire 2. The strain amount detection device 1 includes a strain measuring element 11, a die bond 12, and a base member 13. One surface of the base member 13 is fixed to the inner surface of the tire 2 with an adhesive 15. The strain measuring element 11 is mounted on the other surface of the base member 13 via the die bond 12.

The strain measuring element 11 is configured by, for example, a strain gauge. In the strain gauge, when a strain body strains, the strain measuring element 11 itself also strains. By a resistance change accompanying the strain, the strain gauge outputs an electric signal corresponding to the strain amount. The die bond 12 is an adhesive that fixes the strain measuring element 11 onto the surface of the base member 13. The strain measuring element 11 and the die bond 12 are sealed on the surface of the base member 13 by a sealing material 14 (e.g., resin).

When the tire 2 strains, the base member 13 itself also strains accordingly, and its strain is transmitted to the strain measuring element 11 via the adhesive 15. That is, the base member 13 acts as the strain body of the strain measuring element 11. As the material of the base member 13, a material that can be fixed to the inner surface of the tire 2 via at least the adhesive 15 and can transmit the strain of the tire 2 to the strain measuring element 11 via the adhesive 15 is used.

Figure 4:
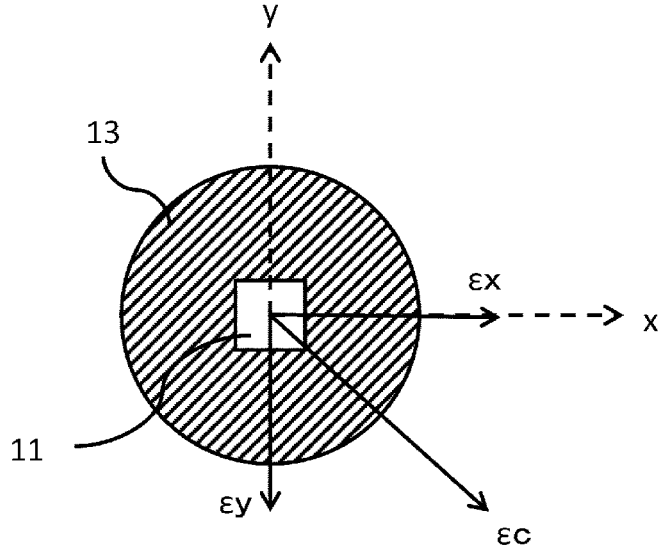
FIG. 4 is a top view of a base member 13.

FIG. 4 is a top view of the base member 13. The x-axis and the y-axis are detection axes on which the strain measuring element 11 detects strain. That is, the strain measuring element 11 can measure strain in the x-axis direction and strain in the y-axis direction.

The base member 13 is configured to equally strain for forces in at least two directions acting on the x-y plane in FIG. 4. Preferably, the base member 13 has a disk shape. When the base member 13 has a disk shape, a force in any direction on the x-y plane in FIG. 4 can be correctly decomposed into an x-component and a y-component. For example, cc in FIG. 4 can be expressed as $\varepsilon c=(\varepsilon x^2+\varepsilon y^2)^{1/2}$. Therefore, a strain direction and a strain amount in any direction on the x-y plane can be measured as a vector amount by one strain measuring element 11.

In order to accurately measure strain in any direction on the x-y plane by one strain measuring element 11, it is desirable that the center (origin of the two measurement axes), on the x-y plane, of the strain measuring element 11 coincides with the center, on the x-y plane, of the base member 13. As a result, strain in any direction on the x-y plane can be detected equally. However, instead of tolerating no slight deviation between the center positions, both the centers may be slightly deviated, for example, due to implementation reasons. In this case, the strain amount measured by the strain measuring element 11 may be calculated and corrected according to the deviation.

Figure 5:
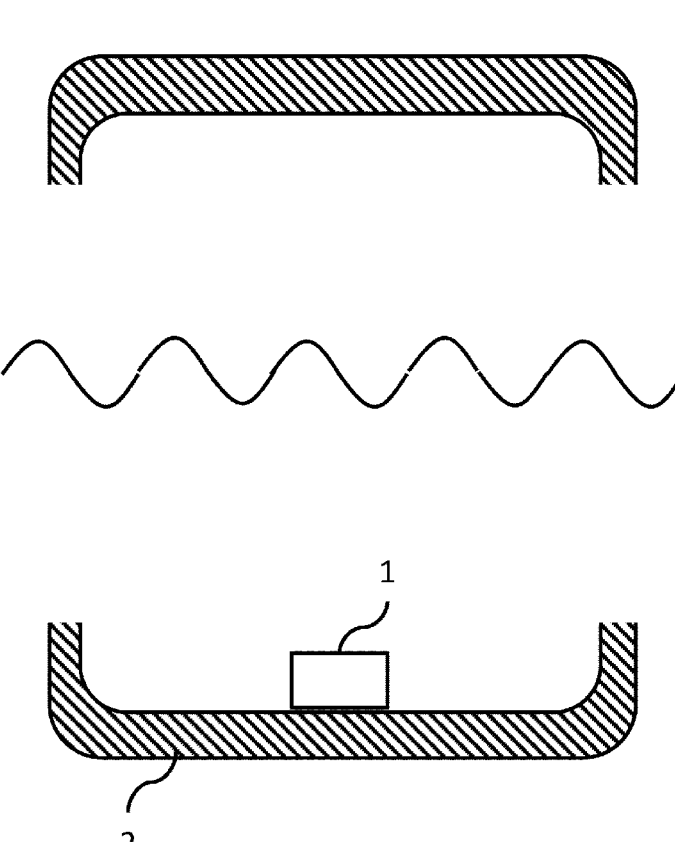
FIG. 5 is a cross-sectional view illustrating the inside of a tire 2.

FIG. 5 is a cross-sectional view illustrating the inside of the tire 2. Here, a cross-sectional view, obtained when the tire 2 is viewed from the front or the rear of the vehicle, is illustrated. It is desirable that the strain amount detection device 1 is disposed near the center in the width direction of the tire (direction orthogonal to the front-rear direction of the vehicle), and it is further desirable that the center in the width direction of the tire and the center in the width direction of the strain amount detection device 1 coincide with each other. This means that the strain amount detection device 1 is disposed at the center of the ground contact surface of the tire. As a result, the deformation direction of the tire and the strain direction of the base member 13 coincide with each other, so that the detection accuracy of the tire strain can be enhanced.

First Embodiment: Summary

In the strain amount detection device 1 according to the present first embodiment, the strain measuring element 11 is disposed on the base member 13 having a disk shape, and the base member 13 acts as the strain body of the strain measuring element 11. As a result, the base member 13 can equally transmit strain in any direction within the disk surface (x-y plane) to the strain measuring element 11. Therefore, strain in any direction within the x-y plane can be detected by one strain measuring element 11.

Second Embodiment

Figure 6:
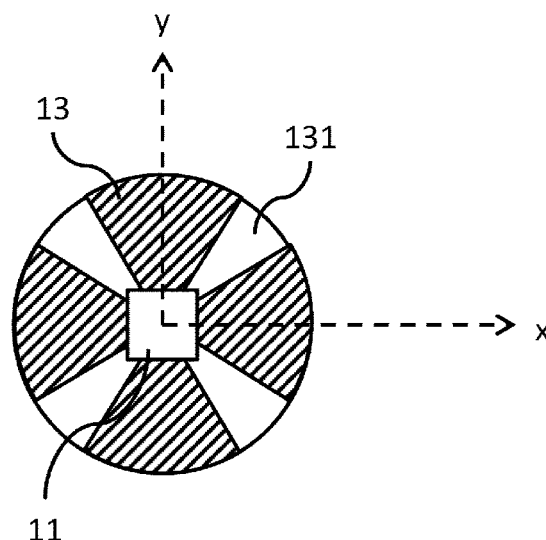
FIG. 6 is a top view of a base member 13 included in a strain amount detection device 1 according to a second embodiment.

FIG. 6 is a top view of a base member 13 included in a strain amount detection device 1 according to a second embodiment of the present invention. The base member 13 in the present embodiment has cutouts 131 in a circumferential portion. The cutout 131 has, for example, an annular fan shape (a fan shape configured by an outer large-diameter arc and an inner small-diameter arc). The number of the cutouts 131 is arbitrary.

As illustrated in FIG. 6, the base member 13 has the cutouts 131, so that the strain detection accuracy in the portion having the cutout 131 (direction from the center of the base member 13 toward the cutout 131, for example, the 45° direction in FIG. 6) is lower than the strain detection accuracy in the portion not having the cutout 131 (direction from the center of the base member 13 toward a position where the cutout 131 is not formed, for example, the 90° direction in FIG. 6). This is because the amount of a member that transmits strain is small. As a result, the strain detection accuracy in a specific direction can be emphasized. In FIG. 6, the detection accuracy in each of the 90° direction, the 180° direction, the 270° direction, and the 360° direction is high. In a case where, for example, when the vehicle turns, strain in a specific direction is detected with high accuracy, the configuration as illustrated in FIG. 6 is useful.

Figure 7:
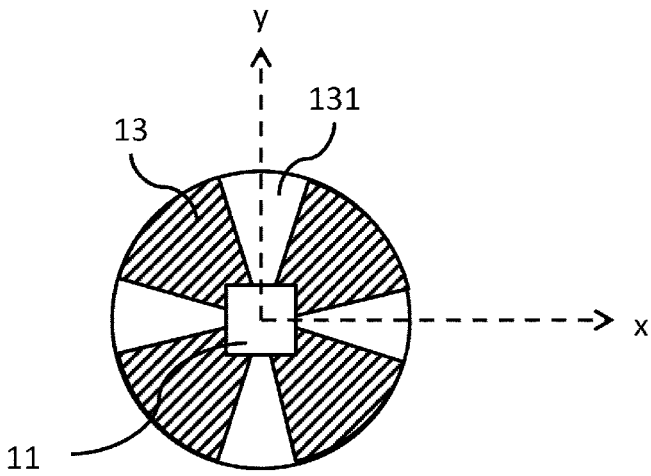
FIG. 7 is a top view illustrating a modification of the base member 13 in the second embodiment.

FIG. 7 is a top view illustrating a modification of the base member 13 in the present second embodiment. In FIG. 6, the cutouts 131 are disposed such that the detection accuracies in the x-y axes directions become high. In FIG. 7, the cutouts 131 are disposed such that the detection accuracies in the x-y axes directions become low. In FIG. 7, the detection accuracy in each of the 45° direction, the 135° direction, the 225° direction, and the 315° direction is high.

Third Embodiment

Figure 8:
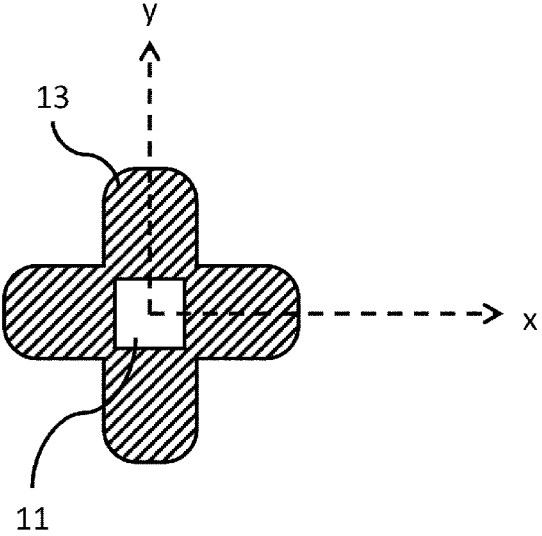
FIG. 8 is a top view of a base member 13 included in a strain amount detection device 1 according to a third embodiment.

FIG. 8 is a top view of a base member 13 included in a strain amount detection device 1 according to a third embodiment of the present invention. The base member 13 in the present embodiment has a protruding portion, a part of the circumference of which protrudes along a radial direction. The thickness, number, and protruding direction of the protruding portion are arbitrary. FIG. 8 illustrates an example in which the slightly thick protruding portions each protrude in the 90° direction, the 180° direction, the 270° direction, and the 360° direction.

A strain detection accuracy in a direction without the protruding portion is lower than that in the direction with the protruding portion. The reason is the same as that the detection accuracy is decreased by the cutout 131. As a result, the strain detection accuracy in a specific direction can be emphasized similarly to the second embodiment.

Modifications of the Present Invention

The present invention is not limited to the above embodiments, and includes various modifications. For example, the above embodiments have been described in detail for easy understanding of the present invention, and the present invention is not necessarily limited to embodiments including all the configurations described above. In addition, a part of the configuration of an embodiment can be replaced with the configuration of another embodiment, or the configuration of an embodiment can be added with the configuration of another embodiment. In addition, a part of the configuration of each embodiment can be added or replaced with another configuration, or deleted.

In the above embodiments, examples have been described in which the strain amount detection device 1 is mounted on a tire to detect the strain of the tire, but the present invention can also be applied to a case where strain of an object other than a tire is detected. That is, by forming the base member 13 in a disk shape, the present invention is useful in an aspect in which deformation in any direction on the x-y plane is equally detected.

REFERENCE SIGNS LIST

1 strain amount detection device
11 strain measuring element
12 die bond
13 base member
14 sealing material
15 adhesive
2 tire

The invention claimed is:

1. A strain amount detection device that detects a strain amount of a tire, the strain amount detection device comprising:
a strain measuring element that detects strain of a strain body; and
a base member that holds the strain measuring element,
wherein the base member has a disk shape, shape, and
wherein the base member acts as the strain body by transmitting strain of an inner wall surface of the tire to the strain measuring element, and
wherein with a cutout provided in a circumferential portion of the disk shape, the strain measuring element is configured such that, as compared with strain detection accuracy in a first direction from a center of the strain measuring element toward the cutout, strain detection accuracy in a second direction from the center of the strain measuring element toward a direction in which the cutout is not formed is higher.

2. The strain amount detection device according to claim 1, wherein the strain measuring element is disposed at a center on one surface of the disk shape of the base member.

3. The strain amount detection device according to claim 1, wherein the strain measuring element is configured to be able to detect strain along a first direction of the strain body and be able to detect strain along a second direction of the strain body, the second direction being different from the first direction.

4. The strain amount detection device according to claim 1, wherein the strain measuring element is fixed to one surface of the disk shape with an adhesive.

5. A tire comprising the strain amount detection device according to claim 1,
wherein, with one surface of the disk shape of the base member connected to the inner wall surface of the tire with an elastic adhesive, the base member is configured to transmit strain of the tire to the strain measuring element.

6. A strain amount detection device that detects a strain amount of a tire, the strain amount detection device comprising:

a strain measuring element that detects strain of a strain body; and a base member that holds the strain measuring element, wherein the base member has a disk shape, wherein the base member acts as the strain body by transmitting strain of an inner wall surface of the tire to the strain measuring element, and wherein with a part of a circumferential portion of the disk shape having a protruding portion that protrudes along a radial direction, the strain measuring element is configured such that, as compared with strain detection accuracy in a first direction from a center of the strain measuring element toward the protruding portion, strain detection accuracy in a second direction from the center of the strain measuring element toward a direction in which the protruding portion is not formed is lower.

7. The tire according to claim 5, wherein the base member is disposed at a center in a width direction of the tire.

* * * * *